US007039872B1

(12) United States Patent
Raheman (10) Patent No.: US 7,039,872 B1
(45) Date of Patent: May 2, 2006

(54) METHOD AND SYSTEM OF CREATING FLOATING WINDOWS FOR DISPLAYING SPONSOR INFORMATION, MESSAGES OR PROGRAMS IN NON-OBTRUSIVE AREAS OF THE GRAPHIC USER INTERFACE OF A SOFTWARE APPLICATION

(75) Inventor: Fazal Sved Raheman, Nagpur, MS (US)

(73) Assignee: Mossman Associates Inc, Blackstone, MA (US)

( * ) Notice: Subject to any disclaimer, the term of this patent is extended or adjusted under 35 U.S.C. 154(b) by 0 days.

(21) Appl. No.: 09/542,392

(22) Filed: Apr. 4, 2000

Related U.S. Application Data

(60) Provisional application No. 60/136,847, filed on Jun. 1, 1999.

(51) Int. Cl.
*G06F 3/14* (2006.01)
(52) U.S. Cl. .................. 715/748; 715/791; 715/797; 715/802; 715/804; 705/14
(58) Field of Classification Search ................ 715/748, 715/733, 767, 802, 856, 859, 860, 862, 791, 715/766, 962, 788, 789, 790, 797, 808, 809, 715/738, 749, 760, 779; 709/217, 201, 203; 705/14

See application file for complete search history.

(56) References Cited

U.S. PATENT DOCUMENTS

| 4,586,035 A | 4/1986 | Baker et al. ................ 340/712 |
| 5,105,184 A | 4/1992 | Pirani et al. | |

(Continued)

FOREIGN PATENT DOCUMENTS

DE 195 28 911 2/1997

(Continued)

OTHER PUBLICATIONS

"Translucent Windows: Dragging an Image without Obscuring the Desktop", IBM Technical Disclosure Bulletin, vol. 37, No. 10, pp. 15-16, Oct. 1, 1994.*

(Continued)

*Primary Examiner*—Raymond J. Bayerl (57) ABSTRACT

Most software applications of the present time have graphic user interface comprising of a document display window and a document supporting substrate area. The document display window is the area where the application user inputs the data and views the results. The substrate areas contain the menus, tools, controls and other accessories, which support the execution of the document. The focus of the application user most of the time is the document window. The substrate area is accessed only intermittently for using the menus, tools and other controls. Depending upon the type of application and the view settings, about 60 to 80 percent of the visible display area is covered by the document window. The remaining 40 to 20 percent is the substrate area. The present invention uses the substrate areas of a software application for displaying sponsor messages/information, contained in one or more floating windows Such floating windows, continuously display in a user friendly way, sponsor messages/information, in a programmed fashion, and also contain URL address for linking the user to the sponsor's web site via an Internet connection, activated by clicking a keyboard mouse combination or by key strike alone or by clicking a button in the corresponding substrate area. The menus, tools and other controls hiding behind the floating windows can be accessed in a non-intrusive manner in one of the several automatic cursor-responsive ways described in the embodiment, without having to manually move such floating windows.

20 Claims, 4 Drawing Sheets

U.S. PATENT DOCUMENTS

| | | | |
|---|---|---|---|
| 5,546,525 A * | 8/1996 | Wolf et al. ................. | 715/809 |
| 5,572,643 A | 11/1996 | Judson ....................... | 395/793 |
| 5,657,049 A | 8/1997 | Ludolph et al. ............ | 345/145 |
| 5,689,666 A * | 11/1997 | Berquist et al. ............ | 715/797 |
| 5,721,853 A | 2/1998 | Smith ......................... | 395/353 |
| 5,740,549 A | 4/1998 | Reilly et al. ................. | 705/14 |
| 5,749,075 A | 5/1998 | Toader et al. ................ | 705/14 |
| 5,774,869 A | 6/1998 | Toader ........................ | 705/10 |
| 5,781,894 A | 7/1998 | Petrecca et al. ............. | 705/14 |
| 5,796,967 A | 8/1998 | Filepp et al. ............... | 395/339 |
| 5,809,242 A | 9/1998 | Shaw et al. ........... | 395/200.47 |
| 5,812,132 A * | 9/1998 | Goldstein ................... | 715/797 |
| 5,819,284 A | 10/1998 | Farber et al. ............... | 707/104 |
| 5,838,790 A | 11/1998 | McAuliffe et al. ............ | 380/4 |
| 5,848,397 A | 12/1998 | Marsh et al. ................. | 705/14 |
| 5,859,639 A * | 1/1999 | Ebrahim ..................... | 715/788 |
| 5,890,172 A | 3/1999 | Borman et al. ............. | 707/501 |
| 5,970,467 A | 10/1999 | Alavi .......................... | 705/10 |
| 5,999,912 A | 12/1999 | Wodarz et al. ............... | 705/14 |
| 6,014,502 A | 1/2000 | Moraes ................. | 395/200.49 |
| 6,034,661 A | 3/2000 | Servan-Scheiber et al. . | 345/127 |
| 6,035,281 A | 3/2000 | Crosskey et al. ............ | 705/14 |
| 6,246,407 B1 * | 6/2001 | Wilks et al. ............ | 715/790 X |
| 6,542,163 B1 * | 4/2003 | Gorbet et al. ........... | 715/808 X |
| 2002/0178232 A1 * | 11/2002 | Ferguson .................... | 709/217 |

FOREIGN PATENT DOCUMENTS

| | | |
|---|---|---|
| EP | 0 422 577 A2 | 4/1991 |
| EP | 0 713 172 A2 | 5/1996 |
| EP | 0 822 535 | 2/1998 |
| WO | WO 97/06636 | 8/1995 |

OTHER PUBLICATIONS www.netzero.net/company.index.html web pages published on the Internet, 2000.

www.netzero.com/advertising/overview.html web pages published on the Internet, 2000.

www.1stup.com/how_free_a.html web pages published on the Internet, 2000.

www.1stup.com/how_free_b.html web pages published on the Internet, 2000.

www.freei.net/url.php?url=help/faq.php web page published on the Internet, 2000.

www.spinway.com/public/html/partner.html web page published on the Internet, 2000.

www.siia.net/piracy/programs/1999gpr.pdf web page published on the Internet, 2000.

International Search Report in PCT International Application No. PCT/GB 00/02109, dated Dec. 15, 2000, 6 pages.

U.S. Appl. No. 09/589,522 entitled "A Novel Method and System of Computer Program and Software Interface, Enabling Unlimited ISP Sponsored Access to the World Wide Web by Client Machines", filed Jun. 7, 2000, 65 pages.

* cited by examiner

METHOD AND SYSTEM OF CREATING FLOATING WINDOWS FOR DISPLAYING SPONSOR INFORMATION, MESSAGES OR PROGRAMS IN NON-OBTRUSIVE AREAS OF THE GRAPHIC USER INTERFACE OF A SOFTWARE APPLICATION

CROSS-REFERENCE TO RELATED APPLICATIONS

This non-provisional application claims the priority filing date from its preceding provisional application No. 60/136,847 and filing date Jun. 1, 1999 entitled, "Method and System of Creating Floating Windows for Displaying Sponsor Information or Messages in the Substrate Areas of the Graphical User Interface of a Software Application."

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The parting century has seen tremendous growth in Radio, Television and Press as media for news and entertainment for common man. Access to information on Radio and television is totally free, while the cost of a printed newspaper is heavily subsidized to make it affordable for every Tom, Dick and Harry. All this has been possible because of the advertisements that are run on these media, the revenue from which support the delivery of these services to the users, who would have otherwise paid the full price of subscribing to these services. Without advertisements radio and television would not have become an integral part of the modern human race.

As the world prepares to enter the next millennium, computers are increasingly entering into homes to become household gadgets. Modern computers are not just capable of performing the routine computing needs, but also all the functions of conventional media, telecommunication and business transactions. All this requires the purchase of software and services by the user. Some of these costs are high enough to limit the role of computers in common man's daily routine. The high cost of software is also a driving force for the huge illegitimate use of pirated software products worldwide, especially in the third world countries. According to the results of a third independent study on global software piracy, conducted by the Business Software Alliance (BSA) and the Software Publishers Association (SPA), the two leading trade associations of the software industry, revenue losses to the worldwide software industry due to piracy were estimated at $11.4 billion (US). The study estimates that, of the 574 million new business software applications installed globally during 1997, 228 million applications—or 40%—were pirated. This represents an increase of two million more new applications being pirated than in 1996. The software piracy is on the rise, although several products are available on the market for preventing illegitimate use of unauthorized copies of software. There was 16 percent decrease in estimated losses between 1995 and 1996, which were generally attributed to lower software prices. Piracy of a product is directly proportional to the need, availability and affordability of the product. The more affordable a product, the lower is it's piracy.

Shareware is an industry, which is barely supporting the talented but struggling programmers, who entirely depend on whatever little money the shareware users volunteer to pay them. If a fair compensation is paid to the shareware programmers from revenues generated by sponsor advertising, without increasing the shareware user costs, the shareware industry will become strong enough to bring high quality software to the computer users, without the inhibitory costs of retail software.

None of the present day software products available on the market incorporate sponsor messages, advertisements or any such approach to either subsidize the end user cost of the software application or improve the customer service offered by the software manufacturer. The computer's inherent interactive nature prevents the utilization of the conventional media advertising approach followed by the radio and television media. While a radio or television program can be interrupted briefly to relay advertising messages, a user working on an application cannot stop to watch advertisements. Hence novel approaches have to be adapted which neither interrupt the work of the user nor cause nuisance to the user. The prior art contains one such attempt made by Pirani and Ekedal (U.S. Pat. No. 5,105,184). Although the disclosure of Pirani and Ekedal is a technologically viable proposition, it falls short of transforming their invention into a commercially viable product, which is why even after almost a decade following their disclosure, no software products incorporating their invention have seen the marketplace. The invention of Pirani and Ekedal teaches the display of advertisement on the various screens of the application, such as menu screen, help screen etc. In a programming language e.g. visual basic, each screen of the application is represented by a form module, which contains programming codes for event procedures, sub-routine procedures and function procedures. Displaying an advertisement on a particular screen, will be a sub-routine procedure, which has to be encoded in the corresponding form module at design time. In practice any software manufacturer will be reluctant to insert subroutine codes for the advertisement file in each and every form module of the ready to market software application, which is required to enable Pirani and Ekedal invention. The risk for introducing new bugs is significant to affect the performance of the software application itself or at least cost the manufacturer further development time. Moreover, this kind of invention will be most likely practiced by the software resellers who subsidize the cost by ads, rather than the software manufacturer, who sells the software in retail. Integration of advertisement according to the teachings of Pirani and Ekedal will expose the source code to the resellers as a consequence of integration. No manufacturer of commercial software application will disclose the source code of his software product to the reseller. Another problem with this kind of integration of ads in the software application is the time relevance of the advertisement, which is very important in today's fast paced computer savvy world. An advertisement, integrated today in a software application, according to the teachings of Pirani and Ekedal, will be history in 6 months, without an update. Yet another shortcoming is absence of a link to the sponsor of specific advertisement for transacting potential business with the sponsor, or retrieving further information on the sponsor's products and services. These deficiencies will discourage a sponsor from paying for the advertisement.

Goldscheider and Konle in their invention of a system for the transmission and display of visual information described in Patent No. WO 97/06636 issued on Feb. 2, 1997, disclose a method for displaying advertisements on to the user's screen area from where the user can order the product or service advertised. They also suggest that such advertisement revenue can subsidize the cost of Internet access. But their invention fails to describe any means of assuring that the user does not avoid seeing the advertisement. This is essential, as advertisers would not want to pay for the unscrupulous use of the free or subsidized use of the Internet services, if their ads are not watched or seen voluntarily by the users. Secondly they also fail to show that such advertisement window retains the focus by permanent default, which is very important for assuring that the window display messages are visible to the user all the time that he is logged in to the service. They further fail to show a user-friendly way of getting around the window for accessing the information masked by such window. Very recently NetZero, Inc., Alta Vista, and other Companies like Tritium Network, Freei.Net, etc. have come up with their own versions of ad display approaches to subsidize the cost of Internet access. All of these companies are following more or less the same approach. They run an ad strip, which is displayed on the screen either blocking a functional area of the users browser application or reducing the browsing window size of the user's browser application. Such ad display windows developed by these companies retain the focus by permanent default assuring continuous display of the advertisement, thereby limiting the unscrupulous use, but they however mask or reduce the document window, to which they provide no easy solution. To access areas masked by such ad strips one has to physically move such ad strips, which may be quite annoying for the user.

Ideal method and system for sponsor information displays in software applications should contain the following qualities.
1. Minimum programming integration with the target software application.
2. Ease of running sponsor displays in any software application or between several applications or in a platform of applications, without modifying the source code of the individual form modules of the application.
3. Minimum interference with the user interaction with the target software application.
4. Minimum or no manipulation of the sponsor display window by the user.
5. Maximum non-stop display time and pixel space.
6. Regular update of the data displayed via a network link such as Internet or TV broadcast.
7. Ease of access to the application menus, tools and controls with no compromise on functionality of the application.
8. URL link for improving customer service or providing sponsor access to the user for any service or request desired.

BRIEF SUMMARY OF THE INVENTION

It is a primary object of the invention to provide a method and system for real time display of sponsor information in software applications, such sponsor information include data, voice, video or a foreign program interface. More specifically it is an object of the invention to create non-obstructive floating windows in the substrate areas of a software application, for displaying sponsor information.

It is another more particular object of the invention to provide a method and system for minimizing the design time integration of sponsor information with the source code of the software application. It is still another object of the invention to provide maximum visibility and non-stop display time for the sponsor information. It is yet another object of the invention to provide easy and automatic access to the menus, tools and controls.

It is further object of the invention to provide a method for preventing user manipulation of the sponsor information display. It is yet another object of the invention to provide a method and system for updating the sponsor information display and a method and system for providing URL link to the sponsor web site. It is also an object of the invention to provide a broadband video display interface within a software application.

As an example in one particular embodiment, the invention is preferably implemented in a computer having a processor, a modem, an operating system, a graphical user interface, the target application, an HTTP-compliant browser and an account with the Internet service provider. In such case, the novel and advantageous features of the invention are achieved using a first means, responsive to opening of the target application, for locating the floating windows in the substrate areas of the target application, a second means for retrieving and displaying the sponsor information in the floating windows, a third means of user access to the substrate areas for operating the menus, tools, controls etc., a is fourth means of user access to the sponsor web site via the sponsor display; and further means of updating the sponsor information by programmed link with the sponsor web site in the background during the idling time of the web browser.

In a practical implementation of the preferred embodiment, the method begins with the display of the floating windows in the substrate areas, when the target application is opened. The floating windows retrieve from a specific directory path, the corresponding file or signals for display. The user can access the underlying substrate area by simply moving the mouse cursor in the desired area of substrate. The floating window disappears, swaps or moves to another location, until the cursor stays in the substrate area or for a predefined time. After finishing the routine, as the user returns the cursor back into the document area, the floating window reappear instantly. In another preferred embodiment this can also be achieved by displaying such menus, tools and controls in the document window in response to a right mouse click or a keyboard strike or a combination of both when the user desires to access such menus, tools and controls.

The menus, tools and other controls, hiding behind the floating windows can be accessed in a non-intrusive manner in one of the following ways, without having to manually move such floating windows.
  a) The floating window disappears as the cursor/mouse pointer is moved on to the corresponding substrate area, thereby allowing no interference in user maneuvering of the menus, tools, controls etc.
  b) The floating window moves to a new location in response to the cursor/mouse pointer exposing the menus, tools controls etc.
  c) Such menus, tools and controls are displayed in the document window in response to a mouse click or a keyboard strike or a combination of both when the user desires to access such menus, tools and controls.
  d) Such menus, tools, controls and other information is compiled in the sponsor message window itself which can be swapped in response to a mouse click or a keyboard strike or a combination of both when the user desires to access such menus, tools, controls and other information.

The user can also access the sponsor's web site in response to the sponsor information by using the control key—mouse click combination or an alternate key activation, in response to which the sponsor's URL link is activated, and the desired web page is displayed in a default HTML-compliant browser, after establishing a contact with the sponsor host server. The display information file although located in the client machine non-volatile data storage area, is intermittently updated in the background, during the idling time of a browsing session.

In another embodiment the floating windows can be displayed in the part of document areas not in use by the user. In another embodiment the method displays a foreign program interface or icon window in an open software application, which window responds to the cursor movement, by disappearing or moving to a different location when the cursor is moved in such interface or icon area, and returns when moved away. The interface or icon can further be accessed by cursor, using the control key—mouse click combination or an alternate key activation, in response to which the foreign program can be executed.

The preceding description outlines some of the more pertinent objects of the present invention, which should be construed to be merely illustrating some of the more prominent features and applications of the invention. Other features will be obvious by referring to the Detailed Description of the preferred embodiment.

BRIEF DESCRIPTION OF THE SEVERAL VIEWS OF THE DRAWING

The following drawings explain the features of the present invention as described in the Detailed Description.

DETAILED DESCRIPTION OF THE INVENTION

Figure 1:
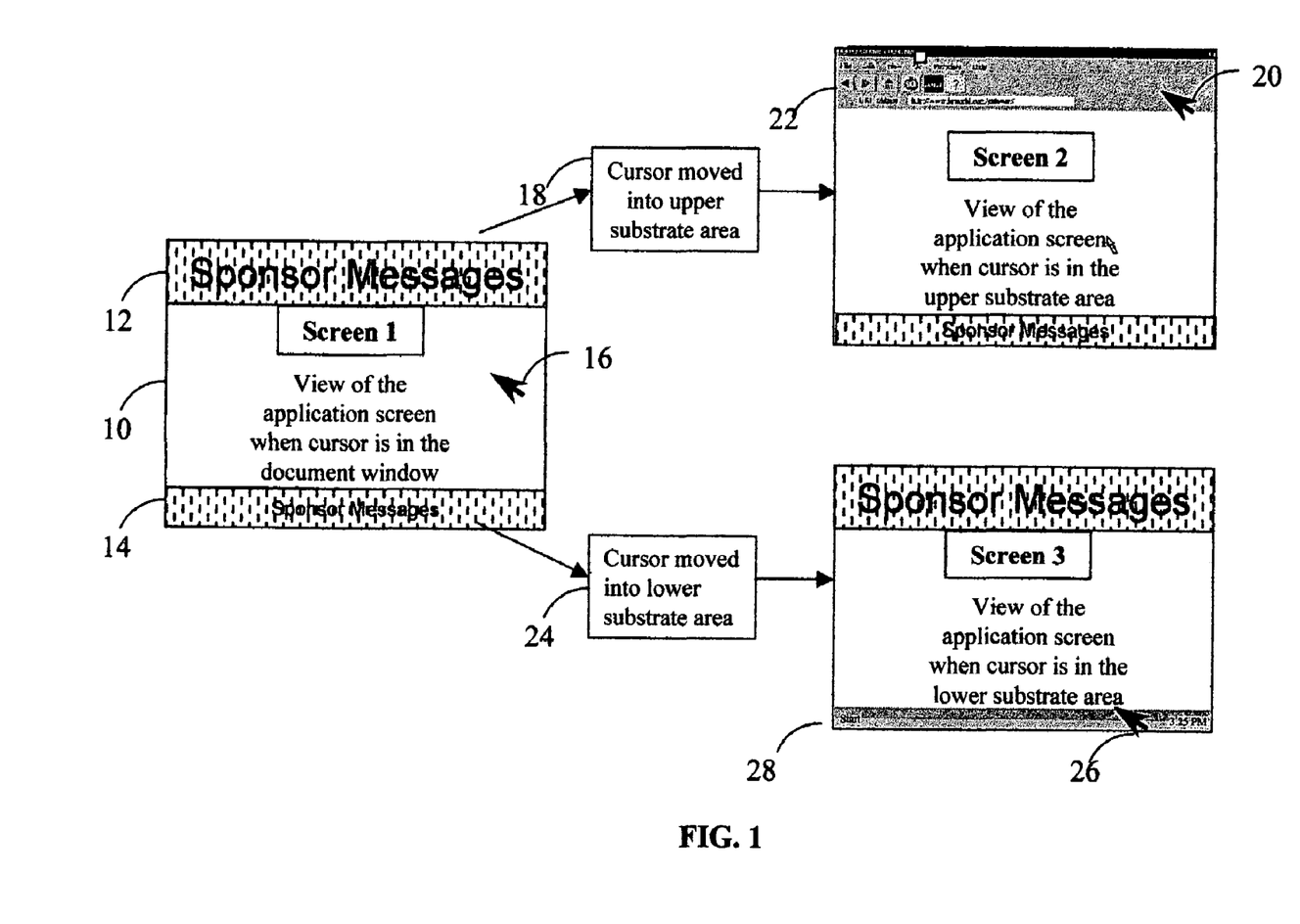
FIG. 1. shows schematically a functional overview of the preferred embodiment and particularly shows the user maneuvering of the floating windows to access the substrate areas.

The system enabling the preferred embodiment of the present invention on a client machine, comprises of an Internet ready CPU, a display monitor, mouse, keyboard, any operating system software such as DOS or Windows 95 from Microsoft, Inc., Linux or Mac OS etc., the target software application and the software of the present invention. FIG. 1 is a block diagram of the appearances of the display screen, during the course of a normal use of the target software application, in the method of the preferred embodiment. When the user opens the target application, the method of preferred embodiment is enabled (Screen 1). The full screen view of the target application comprises of the document window 10, the upper floating window 12 anchored to the upper substrate area and the lower floating window 14 anchored to the lower substrate area of the target application. Each of the floating window displays one or more sponsor messages. The mouse cursor 16 is placed in the document window. When user moves 18 the cursor into the upper substrate area 20, the upper floating window disappears exposing the upper substrate area 22 of the target application (Screen 2). Using the mouse cursor 20 in the upper substrate, user can perform all the functions of the target application without any interference from the floating window. In a similar fashion when the mouse cursor is moved 24 from the document window 16 into the lower substrate area 26 the lower floating window disappears making the lower substrate area available for user maneuvering (Screen 3). Alternatively the floating windows can slide to a new location instead of disappearing, thereby exposing the hidden areas.

Figure 2:
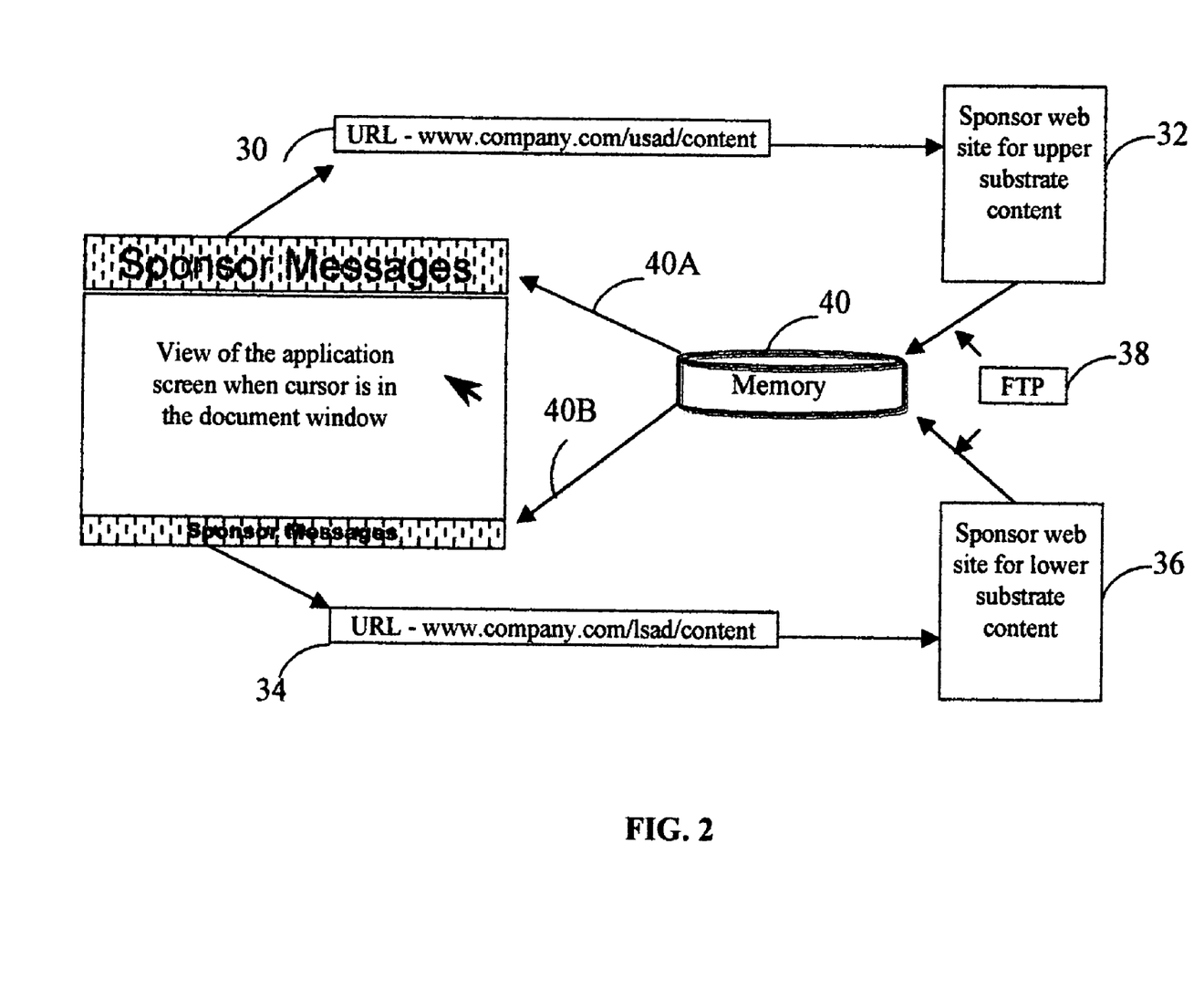
FIG. 2. shows the scheme for auto updating the floating windows sponsor information from the sponsor web site to the location of sponsor information file in the storage of the user machine during the idling time of a web browsing session.

FIG. 2 is a block diagram depicting the method of preferred embodiment enabling the automatic content update of the floating window displays. The content file for the floating windows is stored in the memory storage area of the client machine such as the hard disk drive 40. When the application is running these files are retrieved from the specific directory in the storage area and displayed 40A & 40B in the specific floating windows. These sponsor content files are updated intermittently in the background during the idling time of a web browsing session. The sponsor URL links 30 & 34 are activated intermittently during a browsing session, irrespective whether the target application is open or closed, and in response an updated sponsor content file is downloaded from specific sponsor web sites 32 & 36 to replace the older sponsor files stored in the hard disk or any such memory storage area 40 of the client machine. Such a file download follows a standard file transfer protocol (FTP) 38 or any such appropriate procedure.

Figure 3:
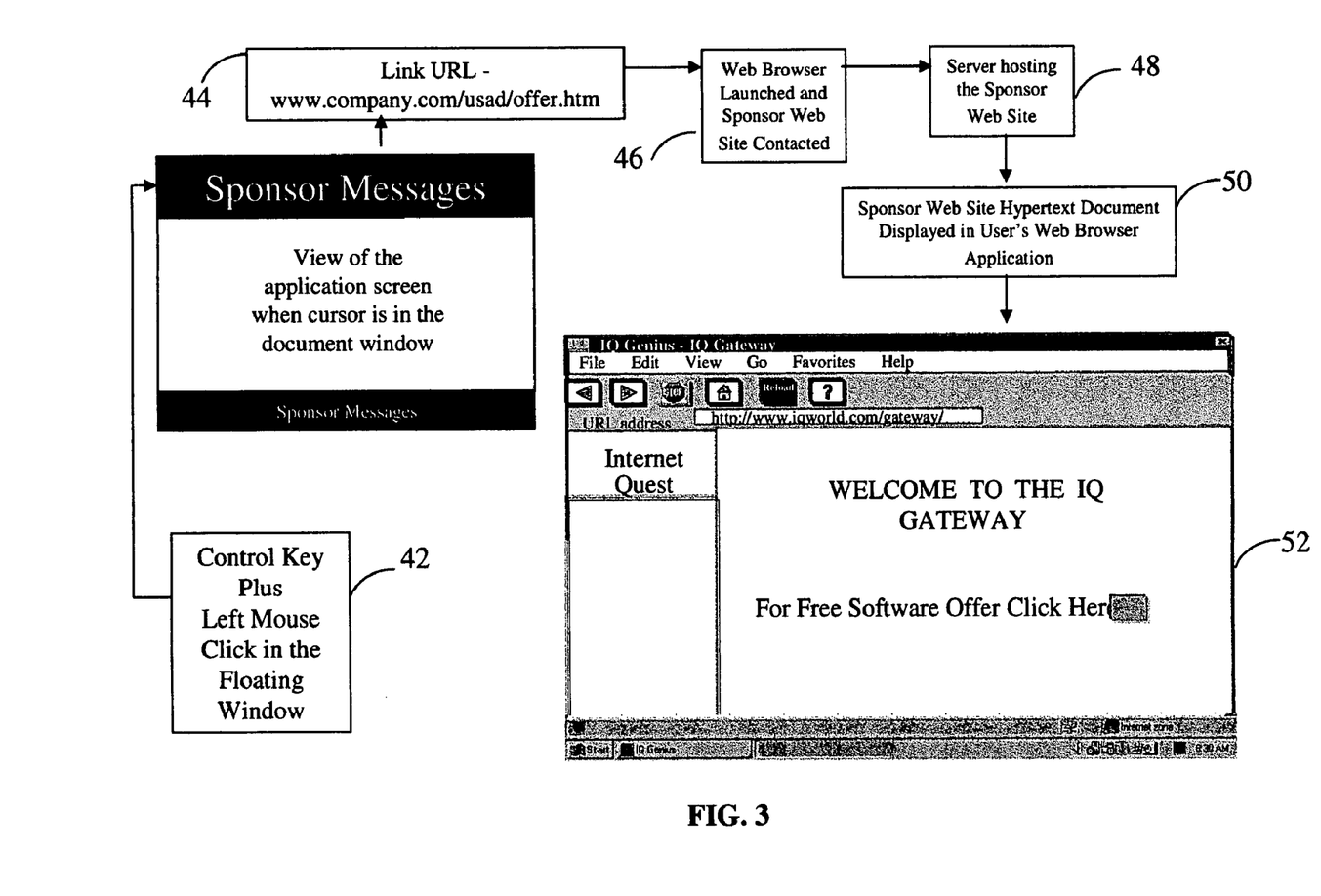
FIG. 3. shows schematically the method for user access to the sponsor web site via the sponsor information display in the floating windows.
Figure 4:
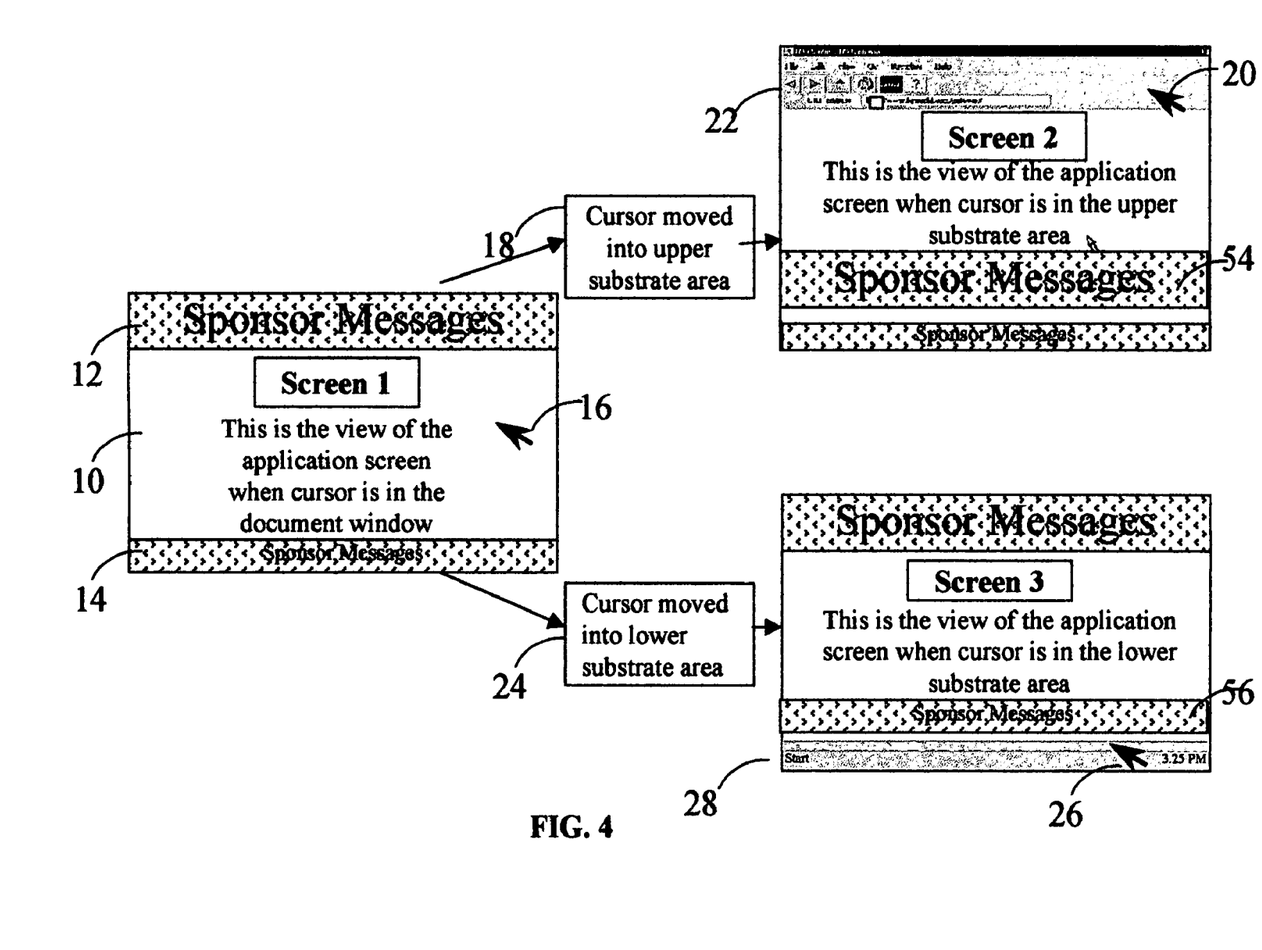
FIG. 4 shows schematically a functional overview of an alternate embodiment to access the substrate areas.

FIG. 3 is a block diagram depicting the method of present invention providing user access to the corresponding web site of each and every sponsor messages in the floating window. If the user wishes to go to the sponsor's web site via the floating window sponsor display, the user can press the control key on the keyboard and move the mouse cursor simultaneously in the floating window area. The floating window will not disappear. The user can position the cursor at a desired location on the floating window and click the mouse 42 while still pressing the control key. This activates the link 44 to the specific server hosting the sponsor web site 48 and launches 46 the default web browser 52 installed on the client machine. As a result, the sponsor's desired hypertext document 50 is displayed in user's web browser application 52. FIG. 4 is the block diagram illustrating a variation in the cursor responsive maneuvering of the floating windows in the preferred embodiment. When user moves 18 the cursor into the upper substrate area 20, the upper floating window moves to a location in the document area 54, exposing the upper substrate area 22 of the target application (Screen 2). Using the mouse cursor 20 in the upper substrate, user can perform all the functions of the target application without any interference from the floating window. In a similar fashion when the mouse cursor is moved 24 from the document window 16 into the lower substrate area 26 the lower floating window moves to a location in the document area 54, making the lower substrate area available for user maneuvering (Screen 3).

Thus the features of the present invention can be utilized in a very user friendly and non-obstructive display of sponsor messages in any software application of the present state-of-the-art. These sponsor messages can also be updated and linked to the sponsor web sites for any business transaction that the user may desire. These features will eventually encourage the sponsors to buy display spots in software application programs, thereby generating significant revenues in sponsorships. This in return will lead to reducing or eliminating the end user cost of the software application, thereby having a negative impact on the piracy of such a software. If a licensed copy of choice software application can be acquired by the end user at a nominal cost, there will be little incentive for circulating pirated versions. The floating windows of the instant invention provide an effective vehicle for displaying paid sponsor messages in a software application, thereby subsidizing the end user cost of software application.

The programming codes for such floating windows are written as sub-routine codes in an external module of the corresponding application or as a patch program which piggybacks on the target application, thereby minimizing the interference with the source code of the target application. The data of such floating windows is updated from the files stored in the resident memory of the client machine, which are auto updated in the background by establishing URL links to the corresponding sponsor sites during the idling time of a user web browsing session.

In the preferred embodiment the floating windows are anchored to and displayed continuously or intermittently, on the substrate areas of an application or take the area of the substrate in an application where substrate area is not present by default. The floating window can align horizontally or vertically. In another related embodiment the menus, tools, controls etc., can be in the form of embedded Java applet or DHTML form, accessed from any part of the document window by a mouse, keyboard or combination command launching.

In yet another embodiment the menus, tools, controls and some such information is compiled in the floating window itself, which window during the normal run time displays sponsor messages, and in response to a mouse or keyboard command swaps the sponsor message with the menus, tools, controls and such other information.

In another embodiment the floating window program of the present invention runs as a stand alone default start up program of the client machine, thereby displaying the floating window contents on a desktop screen or on/as a screen saver.

In yet another embodiment of the present invention, the floating window program runs by default with every application installed on client machine and displays sponsor messages continuously in the substrate area of each and every application, which is open. In other words the floating window retains the focus even when the focus is moved from one application to another.

In still another variation of this embodiment, the floating window continuously displays sponsor messages in a defined area outside and tiled with the open application window. These sponsor messages are in the form of data, voice or video files.

In yet another embodiment of the present invention the floating window is a means of real time communication between employees of a company or institution or a chat group.

In yet another embodiment it displays real time mail and incoming messages. In still another embodiment it displays real time news, commentaries etc. In yet another embodiment at least one of the floating windows may function as an interface for transmission of the local radio or television broadcast.

While the preferred embodiment of the present invention is disclosed as a method in terms of block diagrams, it will be understood by a person of ordinary skill in the art, that an apparatus or an article of manufacture, such as a pre-recorded disk or other similar computer program product can be used to facilitate the practice of the method of this invention. It will be understood that such apparatus and articles of manufacture also fall within the spirit and scope of the invention. Several embodiments of the present invention are specifically illustrated and described herein above. However, it will be appreciated that modifications and variations of the present invention are inherently covered by the above teachings and fall within the purview of the appended claims, without departing from the spirit and intended scope of the invention.

What I claim as my invention is:

1. A method of creating one or more floating windows, by permanent default, anchored or aligned to the substrate or document areas of the integrated or an unrelated software application, installed on a client machine, enabling real time continuous or intermittent display of Web-compliant sponsor data files, which simultaneously window retains focus with the application and is non-obtrusive, allowing automatic cursor-responsive access to the hidden/invisible controls, tools and any such information masked by such window; and cannot be closed, moved, manipulated, interacted or unfocused, in any other way than defined by the sponsor.

2. The method of claim 1, wherein the document area comprises about 60 to 80 percent of the application window, the substrate areas comprises about 20 to 40 percent of the application window, and the messages displayed in the substrate areas comprise part or all of the substrate areas.

3. The method of claim 1, wherein the program algorithm is a Web application delivered from a Web application server as a Web page applet.

4. The method of claim 1, wherein the menus, controls, tools and any other information masked by the floating window can be accessed by launching replicas of such menus, controls, tools etc in the form of embedded Java applet or DHTML form in any part of the document area in response to a mouse or keyboard command.

5. The method of claim 1, wherein the menus, tools, controls and other information are compiled in the sponsor message window itself, which information can be swapped with the application in focus, in response to a mouse click or a keyboard strike or a combination of both, when the user desires to access such menus, tools, controls and other information.

6. The method of claim 1, wherein the floating window is programmed to display its non-obtrusive cursor-responsive functionality, in more than one or all the applications installed on the client machine.

7. The method of claim 1, wherein the floating window displays and auto updates the display, by auto retrieving substitute files from computer's storage area and/or by downloading the corresponding files from predefined web site URL using an HTTP, FTP or any Web-compatible file transfer protocol.

8. The method of claim 1, wherein the floating window is delivered to the client machine as a Web page by an Internet server application in response to a specific URL request by the client.

9. The method of claim 1, wherein such floating window displays in real time, sponsor, application manufacturer, reseller, paid service provider messages, or communication between the members of chat groups.

10. The method of claim 1, wherein the floating window is an interface for playing the broadcast media signals of radio or television channel or broadband video.

11. A method of creating one or more floating windows in a GUI application running on a client machine, wherein such window:
   a) is always located outside the document display or data input area of an application, but within the outer limits of such application, such area herein referred as the substrate area of the application;
   b) is anchored or aligned with part or all of the substrate areas of the application;
   c) is simultaneously in active focus of the same or parallel running application;
   d) is displayed by permanent default with either launch of an application or is delivered by a Web server application in response to a specific URL request;
   e) is displayed continuously or intermittently, for either a predefined length of time or until the closing of the application;
   f) disappears, swaps or moves to another location exposing the menus, controls, tools in the substrate area instantly;
   g) displays contents transmitted in any Web compliant format, which content can be accessed for full view display, by a keyboard command or by keyboard mouse command combination; and
   h) can neither be closed, moved, manipulated or interacted in any other way than illustrated in (a) through (g), by the user.

12. The method of claim 11, wherein the document area comprises about 60 to 80 percent of the application window, the substrate area comprises about 20 to 40 percent of the application window, and the messages displayed in the substrate area comprise part or all of the substrate area.

13. The method of claim 11, wherein the program algorithm is a Web application delivered from a Web application server as a Web page applet/servelet.

14. The method of claim 11, wherein the menus, controls, tools and any other information masked by the floating window can be accesssed by launching replicas of such menus, controls, tools and any other information in the form of embedded Java applet or DHTML form in any part of the document area in response to a mouse or keyboard command.

15. The method of claim 11, wherein the menus, tools, controls and other information is compiled in the sponsor message window itself which information can be swapped with the application in focus, in response to a mouse click or a keyboard strike or a combination of both when the user desires to access such menus, tools, controls and other information.

16. The method of claim 11, wherein the floating window is programmed to display its non-obtrusive functionality, in more than one or all the applications installed on the client machine.

17. The method of claim 11, wherein the floating window displays and auto updates the display, by auto retrieving substitute files from computer's storage area and/or by downloading the corresponding files from predefined web site URL using an HTTP, FTP or any Web-compatible file transfer protocol.

18. The method of claim 11, wherein the floating window is delivered to the client machine as a Web page by an Internet server application in response to a specific URL request by the client.

19. The method of claim 11, wherein such floating window displays in real time, sponsor, application manufacturer, reseller, paid service provider messages or communications between the members of chat groups.

20. The method of claim 11, wherein the floating window is an interface for playing the broadcast media signals of radio or television channel or broadband video.

* * * * *